(12) United States Patent
Li et al.

(10) Patent No.: US 11,999,082 B2
(45) Date of Patent: Jun. 4, 2024

(54) FAST-CURING MOLDING PROCESS FOR EPOXY RESIN BASED ON ELECTROMAGNETIC INDUCTION HEATING

(71) Applicant: Huazhong University of Science and Technology, Wuhan (CN)

(72) Inventors: Renfu Li, Wuhan (CN); Yichao Li, Wuhan (CN); Ao Sun, Wuhan (CN); Jiaji Sun, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 0 days.

(21) Appl. No.: 18/494,793

(22) Filed: Oct. 26, 2023

(65) Prior Publication Data

US 2024/0149500 A1 May 9, 2024

(30) Foreign Application Priority Data

Nov. 9, 2022 (CN) .......................... 202211400857.3

(51) Int. Cl.
| | | |
|---|---|---|
| *B29C 35/08* | (2006.01) | |
| *B29C 39/00* | (2006.01) | |
| *B29C 39/38* | (2006.01) | |
| *B29K 63/00* | (2006.01) | |
| *B29K 505/12* | (2006.01) | |

(52) U.S. Cl.
CPC ........ *B29C 35/0805* (2013.01); *B29C 39/003* (2013.01); *B29C 39/38* (2013.01); *B29C 2035/0811* (2013.01); *B29K 2063/00* (2013.01); *B29K 2505/12* (2013.01)

(58) Field of Classification Search
CPC ............. B29C 33/06; B29C 2035/0811; B29C 66/91651; B29C 65/46; B29C 65/3604; B29C 65/36; B29C 65/32; B29C 65/14; B29C 39/38; B29C 39/003; B29C 35/0805

See application file for complete search history.

(56) References Cited

FOREIGN PATENT DOCUMENTS

| | | |
|---|---|---|
| CN | 104927732 A | 9/2015 |
| CN | 113861625 A | 12/2021 |
| CN | 215864459 U | 2/2022 |

*Primary Examiner* — Stella K Yi
(74) *Attorney, Agent, or Firm* — Nitin Kaushik

(57) ABSTRACT

The present invention provides a fast-curing molding process for epoxy resin. The method includes the following steps: S1, mixing epoxy resin A glue and a protein-grafted manganese-zinc-iron oxide nanomaterial well into a colloidal state, and grounding the mixture for 10 to 30 min; S2, adding epoxy resin B glue to the mixed colloid in S1, and performing ultrasonic dispersion at 20 to 30° C. for 10 to 30 min; and S3, placing the mixture obtained after ultrasonic dispersion in S2 in a vacuum environment for 20 to 40 min, then taking the mixture out and injecting the mixture into a mold, placing the mold and the mixed colloid into an electromagnetic induction heater, placing the electromagnetic induction heater in a magnetic field environment with a magnetic field intensity of 1 to 1.5 mT for 2 to 3 h, cooling and then taking them out to obtain the cured epoxy resin.

7 Claims, 5 Drawing Sheets

FAST-CURING MOLDING PROCESS FOR EPOXY RESIN BASED ON ELECTROMAGNETIC INDUCTION HEATING

CROSS-REFERENCE TO RELATED APPLICATIONS

The application claims priority to Chinese patent application No. 2022114008573, filed on Nov. 9, 2022, the entire contents of which are incorporated herein by reference.

TECHNICAL FIELD

The present invention relates to the technical field of epoxy resin curing, in particular to a fast-curing molding process for epoxy resin based on electromagnetic induction heating.

BACKGROUND

Epoxy resin has been widely used in aerospace, transportation, sports equipment, electrical and electronics, equipment emergency repair, new energy technologies and other fields owing to its excellent mechanical properties. This material is usually cured and molded by means of heating in an oven or autoclave. However, for epoxy resin parts with complex shape, large size and large thickness, a large number of residual stresses are easy to generate in these parts due to long curing time, uneven heat transfer and other problems during the heating and curing process, which affects the molding quality of the parts. Whether the in-situ heating inside epoxy resin parts can be achieved by a certain process to make them fast cured and molded is the key to solve the above problems. Among the current fast-curing methods, fast-curing thermosetting adhesives, that is, quick-drying adhesives, are limited in use scenarios, but most of them can only be used for home manual work; light curing will have a non-negligible impact on workers' health; and electron beam curing has a large initial investment, and high equipment requirements. Therefore, finding a low-cost, uniformly-heating fast-curing molding process has become a key factor in reducing the cost and increasing the performances.

The invention patent with patent No. CN104312510A discloses a magnetocaloric curing method for a thermosetting resin adhesive. The method includes: adding magnetic ferrite to resin, stirring and performing ultrasonic dispersion, then adding a curing agent, mixing well and then pouring the mixture into a mold, and placing the mold in a magnetic field to obtain the thermosetting resin adhesive. The epoxy resin material parts which are prepared by the above method often have low strength, small modulus and other problems, and thus cannot meet the standards used in production.

SUMMARY

In view of this, the present invention provides a fast-curing molding process for epoxy resin based on electromagnetic induction heating, and the produced epoxy resin material has high strength and large modulus, and meets the standards used in production.

The technical solution of the present invention is implemented as follows: the present invention provides a fast-curing molding process for epoxy resin based on electromagnetic induction heating. The method includes the following steps:

S1, mixing epoxy resin A glue and a protein-grafted manganese-zinc-iron oxide nanomaterial well into a colloidal state, and grinding the mixture for 10 to 30 min;

S2, adding epoxy resin B glue to the mixed colloid in S1, and performing ultrasonic dispersion for at 20 to 30° C. for 10 to 30 min; and S3, placing the mixture obtained after ultrasonic dispersion in S2 in a vacuum environment for 20 to 40 min, then taking the mixture out and injecting the mixture into a mold, placing the mold and the mixed colloid into an electromagnetic induction heater, placing the electromagnetic induction heater in a magnetic field environment with a magnetic field intensity of 1 to 1.5 mT for 2 to 3 h, cooling and then taking them out to obtain the cured epoxy resin.

Based on the above technical solution, preferably, a method for preparing the protein-grafted manganese-zinc-iron oxide nanomaterial includes the following steps:

S1, dissolving gelatin powder in 50 to 60 mL of acetic acid solution, stirring magnetically at 50 to 60° C. for 50 to 60 min, then cooling to 20 to 30° C., then adding a manganese-zinc ferrite nanomaterial and performing ultrasonic treatment for 10 to 20 min; and S2, performing suction filtration on the ultrasonically-treated mixed solution, washing the mixed solution with deionized water for 3 to 5 times, drying for 10 to 12 h, and grinding to obtain the protein-grafted manganese-zinc ferrite nanomaterial.

Based on the above technical solution, preferably, a mass ratio of the gelatin to the manganese-zinc ferrite nanomaterial is 1:(2-3).

Based on the above technical solution, preferably, the acetic acid solution is an aqueous acetic acid solution having a volume fraction of 60 to 80%.

Based on the above technical solution, preferably, the protein-grafted manganese-zinc ferrite nanomaterial has an average particle size of 0.2 to 0.5 μm.

Based on the above technical solution, preferably, the manganese-zinc ferrite nanomaterial has a magnetic permeability of 2400 to 2600 dB/dH.

Based on the above technical solution, preferably, the manganese-zinc ferrite nanomaterial has a Mn/Zn mass ratio of 3:(1-1.5).

Based on the above technical solution, preferably, a mass ratio of the epoxy resin A glue to the epoxy resin B glue to the protein-grafted manganese-zinc-iron oxide nanomaterial is 10:(3-3.5):(0.85-2).

Based on the above technical solution, preferably, the epoxy resin A glue is one of YH-9621 epoxy resin A glue, E-51 epoxy resin A glue, and K-960 epoxy resin A glue.

Based on the above technical solution, preferably, the epoxy resin B glue is one of YH-9621 epoxy resin B glue, 650 low molecular weight polyamide resin, and K-960 epoxy resin B glue.

Compared with the prior art, the fast-curing molding process for epoxy resin based on electromagnetic induction heating of the present invention has the following beneficial effects:

(1) protein-grafted Mn—Zn ferrite Curie magnetic nanoparticles are dispersed in the epoxy resin and the epoxy resin is heated in situ by an electromagnetic induction method, which can shorten the curing time of the epoxy resin, and also greatly improves its mechanical properties to meet the needs of production.

(2) The manganese-zinc ferrite nanomaterial treated with gelatin in an acidic environment has a small particle size and good dispersion effect in the epoxy resin, thereby increasing the performances of the cured epoxy resin material.

BRIEF DESCRIPTION OF DRAWINGS

To describe the embodiments of the present invention or the technical solutions in the prior art more clearly, the following briefly introduces the accompanying drawings required for describing the embodiments or the descriptions in the prior art. Apparently, the accompanying drawings in the following description show merely some embodiments of the present invention, and a person of ordinary skill in the art may still derive other drawings from these accompanying drawings without paying creative efforts.

DETAILED DESCRIPTION OF THE EMBODIMENTS

Figure 1:
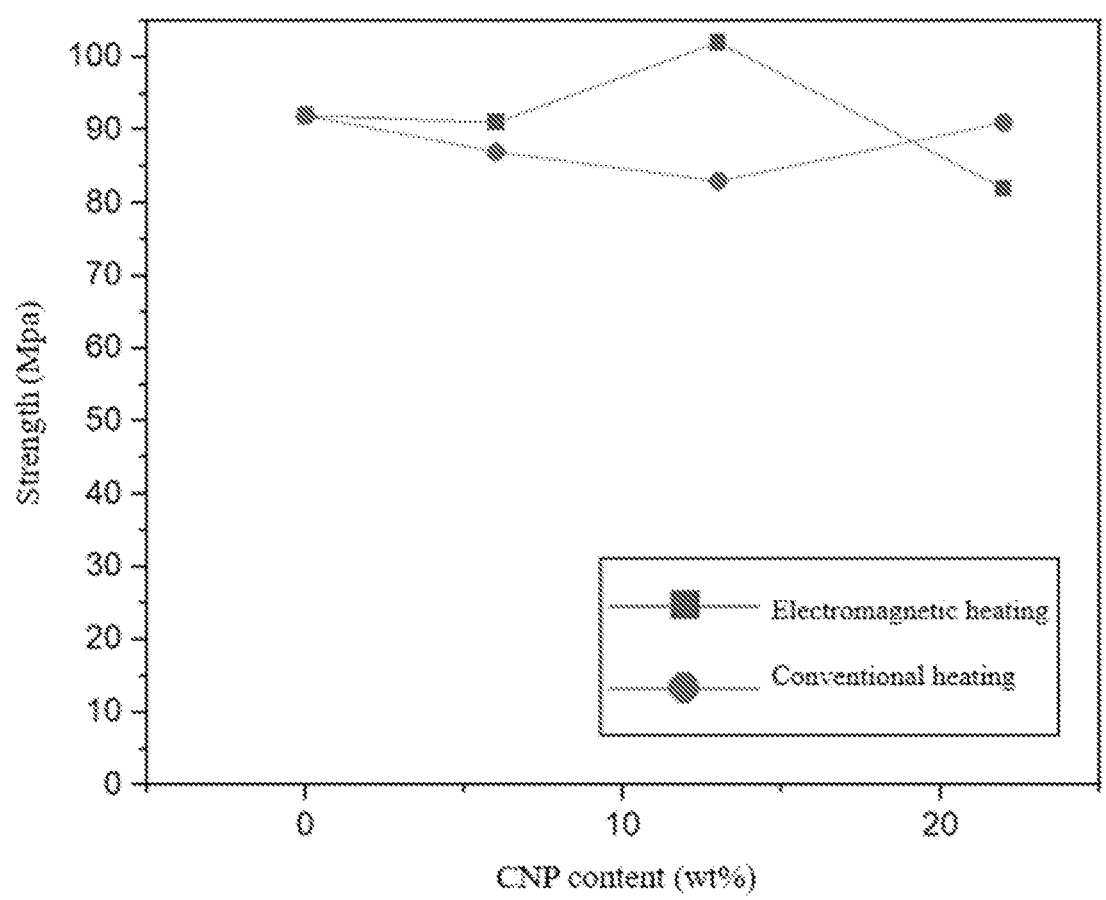
FIG. 1 is a strength diagram of an epoxy resin material prepared by a curing molding process of the present invention.

The technical solutions in the embodiments of the present invention will be described clearly and completely in conjunction with the embodiments of the present invention. Apparently, the described embodiments are merely some embodiments, rather than all embodiments, of the present invention. Based on the embodiments of the present invention, all other embodiments derived by a person of ordinary skill in the art without creative efforts shall fall within the protection scope of the present invention.

Gelatin powder, acetic acid, a manganese-zinc ferrite nanomaterial, YH-9621 epoxy resin AB glue, E-51 epoxy resin A glue, 650 low molecular weight polyamide resin, and K-960 epoxy resin AB glue used in the present invention are all materials purchased on the market.

Example I

A method for preparing a protein-grafted manganese-zinc-iron oxide nanomaterial includes the following steps:

S1, dissolving 1 g of gelatin powder in 50 mL of aqueous acetic acid solution with a volume fraction of 80%, and stirring the mixture in a constant-temperature oil bath magnetic stirrer at 50° C. for 50 min; after stirring, cooling to 20° C., then adding 2 g of manganese-zinc ferrite nanomaterial ($Mn_3Zn_1Fe_2O_4$, with a magnetic permeability of 2400 dB/dH), and performing ultrasonic treatment for 10 min under water bath conditions; and S2. performing suction filtration on the ultrasonically-treated mixed solution, washing the mixed solution with deionized water for 3 times, drying in a vacuum drying oven at 70° C. for 10 h, and finally grinding to obtain the protein-grafted manganese-zinc ferrite nanomaterial having an average particle size of 0.2 μm.

A fast-curing molding process for epoxy resin based on electromagnetic induction heating includes the following steps:

S1, taking 10 g of YH-9621 epoxy resin A glue and 1.8 g of protein-grafted manganese-zinc-iron oxide nanomaterial, placing them in a ball grinder, and grinding for 10 min till they are mixed well into a colloidal state;

S2, adding 3 g of YH-9621 epoxy resin B glue to the mixed colloid in S1, and performing ultrasonic dispersion at 20° C. for 10 min at a power of 300 w; and S3, placing the mixture obtained after ultrasonic dispersion in S2 in a vacuum environment for 20 min, debubbling, then taking the mixture out and injecting the mixture into a mold, placing the mold and the mixed colloid into an electromagnetic induction heater, placing the electromagnetic induction heater in a magnetic field environment with a magnetic field intensity of 1 mT for 2 h, cooling and then taking them out to obtain the cured epoxy resin.

Example II

A method for preparing a protein-grafted manganese-zinc-iron oxide nanomaterial includes the following steps:

S1, dissolving 1 g of gelatin powder in 55 mL of aqueous acetic acid solution with a volume fraction of 70%, and stirring the mixture in a constant-temperature oil bath magnetic stirrer at 55° C. for 60 min; after stirring, cooling to 25° C. then adding 2.5 g of manganese-zinc ferrite nanomaterial ($Mn_3Zn_1Fe_2O_4$, with a magnetic permeability of 2500 dB/d), and performing ultrasonic treatment for 15 min under water bath conditions; and S2, performing suction filtration on the ultrasonically-treated mixed solution, washing the mixed solution with deionized water for 4 times, drying in a vacuum drying oven at 70° C. for 11 h, and finally grinding to obtain the protein-grafted manganese-zinc ferrite nanomaterial having an average particle size of 0.2 to 0.5 μm.

A fast-curing molding process for epoxy resin based on electromagnetic induction heating includes the following steps:

S1, taking 10 g of E-51 epoxy resin A glue and 2.1 g of protein-grafted manganese-zinc-iron oxide nanomaterial, placing them in a ball grinder, and grinding for 20 min till they are mixed well into a colloidal state;

S2, adding 3.2 g of 650 low molecular weight polyamide resin to the mixed colloid in S1, and performing ultrasonic dispersion at 25° C. for 20 min at a power of 300 w; and S3, placing the mixture obtained after ultrasonic dispersion in S2 in a vacuum environment for 30 min, debubbling, then taking the mixture out and injecting the mixture into a mold, placing the mold and the mixed colloid into an electromagnetic induction heater, placing the electromagnetic induction heater in a magnetic field environment with a magnetic field intensity of 1.2 mT for 2.5 h, cooling and then taking them out to obtain the cured epoxy resin.

Example III

A method for preparing a protein-grafted manganese-zinc-iron oxide nanomaterial includes the following steps:

S1, dissolving 1 g of gelatin powder in 60 mL of aqueous acetic acid solution with a volume fraction of 60%, and stirring the mixture in a constant-temperature oil bath magnetic stirrer at 60° C. for 60 min; after stirring, cooling to 30° C., then adding 3 g of manganese-zinc ferrite nanomaterial ($Mn_3Zn_{1.5}Fe_2O_4$, with a magnetic permeability of 2600 dB/dH), and performing ultrasonic treatment for 20 min under water bath conditions; and S2, performing suction filtration on the ultrasonically-treated mixed solution, washing the mixed solution with deionized water for 5 times, drying in a vacuum drying oven at 70° C. for 12 h, and finally grinding to obtain the protein-grafted manganese-zinc ferrite nanomaterial having an average particle size of 0.2 to 0.5 μm.

A fast-curing molding process for epoxy resin based on electromagnetic induction heating includes the following steps:

S1, taking 10 g of K-960 epoxy resin A glue and 2.5 g of protein-grafted manganese-zinc-iron oxide nanomaterial, placing them in a ball grinder, and grinding for 30 min till they are mixed well into a colloidal state;

S2, adding 3.5 g of K-960 epoxy resin B glue to the mixed colloid in S1, and performing ultrasonic dispersion at 30° C. for 30 min at a power of 300 w; and S3, placing the mixture obtained after ultrasonic dispersion in S2 in a vacuum environment for 40 min, debubbling, then taking the mixture out and injecting the mixture into a mold, placing the mold and the mixed colloid into an electromagnetic induction heater, placing the electromagnetic induction heater in a magnetic field environment with a magnetic field intensity of 1.5 mT for 3 h, cooling and then taking them out to obtain the cured epoxy resin.

Example IV

A method for preparing a protein-grafted manganese-zinc-iron oxide nanomaterial includes the following steps:

S1, dissolving 1 g of gelatin powder in 56 mL of aqueous acetic acid solution with a volume fraction of 75%, and stirring the mixture in a constant-temperature oil bath magnetic stirrer at 60° C. for 50 min; after stirring, cooling to 30° C., then adding 2.5 g of manganese-zinc ferrite nanomaterial ($Mn_3Zn_1Fe_2O_4$, with a magnetic permeability of 2550 dB/dH), and performing ultrasonic treatment for 20 min under water bath conditions; and S2, performing suction filtration on the ultrasonically-treated mixed solution, washing the mixed solution with deionized water for 5 times, drying in a vacuum drying oven at 70° C. for 12 h, and finally grinding to obtain the protein-grafted manganese-zinc ferrite nanomaterial having an average particle size of 0.2 to 0.5 μm.

A fast-curing molding process for epoxy resin based on electromagnetic induction heating includes the following steps:

S1, taking 10 g of YH-9621 epoxy resin A glue and 2 g of protein-grafted manganese-zinc-iron oxide nanomaterial, placing them in a ball grinder, and grinding for 30 min till they are mixed well into a colloidal state;

S2, adding 3 g of YH-9621 epoxy resin B glue to the mixed colloid in S1, and performing ultrasonic dispersion at 30° C.: for 30 min at a power of 300 w; and S3, placing the mixture obtained after ultrasonic dispersion in S2 in a vacuum environment for 40 min, debubbling, then taking the mixture out and injecting the mixture into a mold, placing the mold and the mixed colloid into an electromagnetic induction heater, placing the electromagnetic induction heater in a magnetic field environment with a magnetic field intensity of 1 mT for 3 h, cooling and then taking them out to obtain the cured epoxy resin.

Comparative Example I

Comparative example I is the same as Example I, except that: the manganese-zinc-iron oxide nanomaterial is not grafted with a protein.

Comparative Example II

Comparative example II is the same as Example I, except that: sodium acetate is replaced with NaOH, and the manganese-zinc-iron oxide nanomaterial is grafted with a protein under an alkaline condition.

Comparative Example III

Comparative example III is the same as Example I, except that: the protein-grafted manganese-zinc-iron oxide nanomaterial is 3.7 g.

Comparative Example IV

Comparative example IV is the same as Example I, except that: the protein-grafted manganese-zinc-iron oxide nanomaterial is 0.8 g.

Comparative Example V

Comparative example V is the same as Example I, except that: the conventional heating: curing molding process in S3 is adopted, and the mold and the mixed colloid are then placed at room temperature for 24 h, and then placed at 70° C. for 4 h.

The strength and modulus of the cured epoxy resin prepared in the examples and the comparative examples are measured, the results are shown in Table 1 and FIGS. 1 to 5, where CNP represents the protein-grafted manganese-zinc-iron oxide nanomaterial.

TABLE 1

Characteristics of cured epoxy resin and particle size of CNP

| | CNP content | Strength (Mpa) | Modulus (Gpa) | CNP particle size |
|---|---|---|---|---|
| Example I | 12% | 100 | 3.4 | 0.2 to 0.5 μm |
| Example II | 14% | 100 | 3.3 | — |
| Example III | 16% | 96 | 3.2 | — |
| Example IV | 13% | 101 | 3.45 | — |
| Comparative example I | — | 73 | 2.84 | 2 to 2.5 μm |
| Comparative example II | — | 84 | 2.87 | 0.8 to 1.5 μm |
| Comparative example III | 22% | 81 | 2.6 | — |
| Comparative example IV | 6% | 90.5 | 3.2 | — |
| Comparative example V | 12% | 84 | 2.7 | — |

Figure 3:
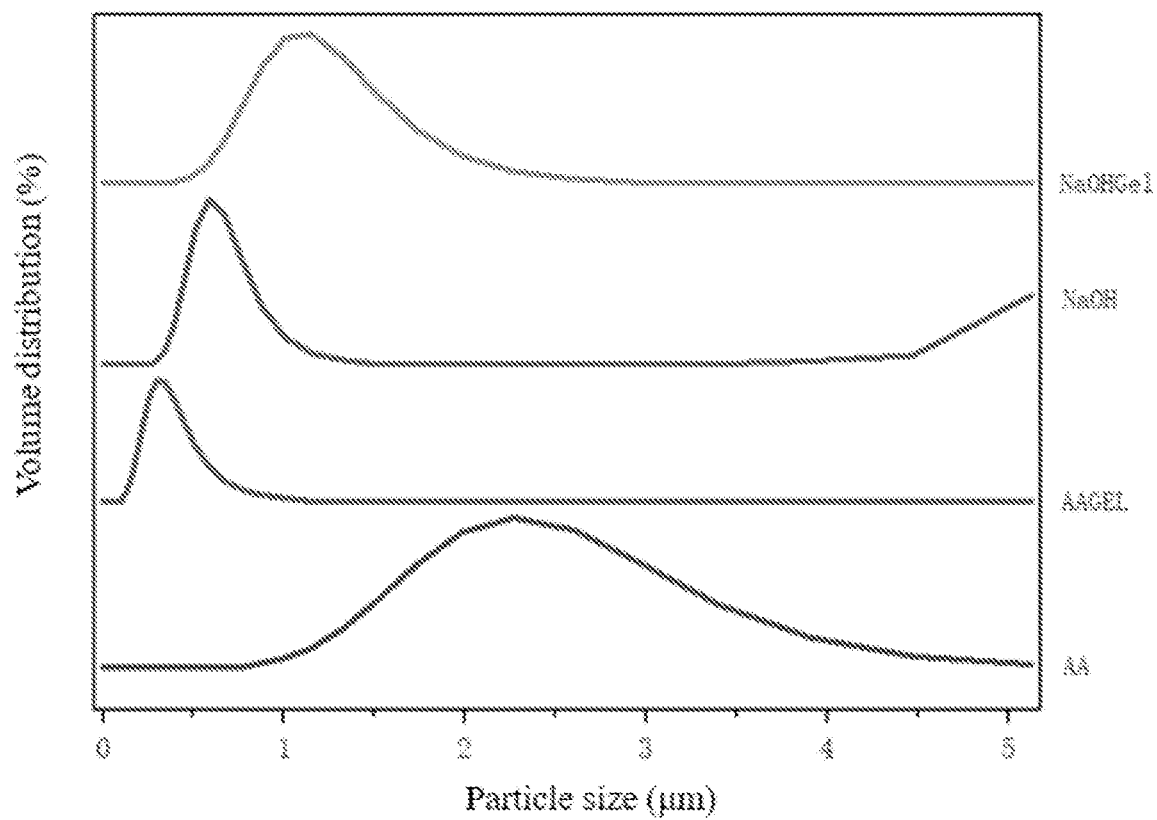
FIG. 3 is a particle size diagram of a protein-grafted manganese-zinc-iron oxide nanomaterial of the present invention.

In FIG. 3, NaOHGel represents a protein-grafted manganese-zinc-iron oxide nanomaterial under an alkaline condition; NaOH represents a manganese-zinc-iron oxide nanomaterial free of a protein under an alkaline condition; AAGel represents a protein-grafted manganese-zinc-iron oxide nanomaterial under an acidic condition; and AA represents a manganese-zinc-iron oxide nanomaterial free of a protein under an acidic condition.

Figure 2:
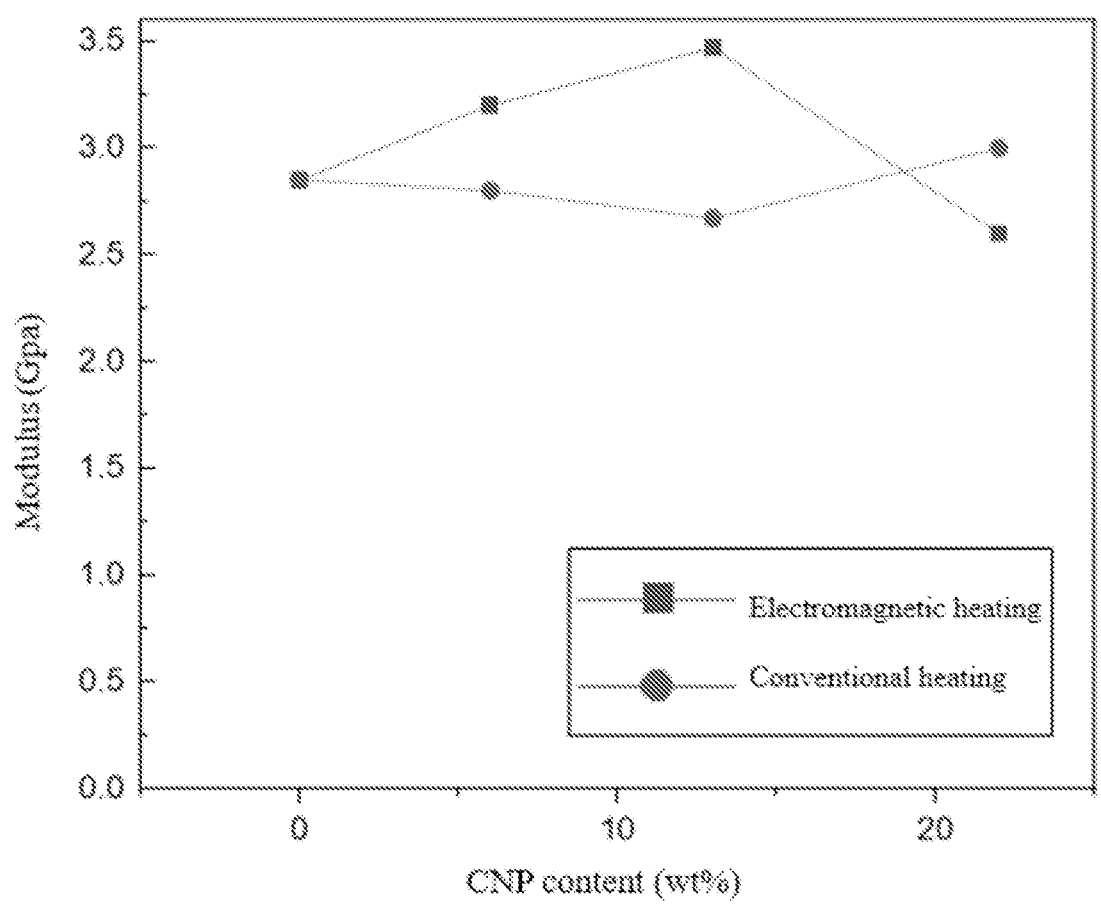
FIG. 2 is a modulus diagram of the epoxy resin material prepared by the curing molding process of the present invention.

As can be seen from Table 1 and FIGS. 1 to 3, compared with conventional heating, the strength and modulus in magnetic heating are reduced, the particle size of the manganese-zinc-iron oxide nanomaterial treated with gelatin under an acidic condition is significantly reduced, and the dispersion effect is promoted. The strength and modulus of a treated epoxy resin specimen are significantly higher than those of an untreated specimen, indicating that the gelatin has the ability to enhance the strength and modulus of the colloid.

Figure 4:
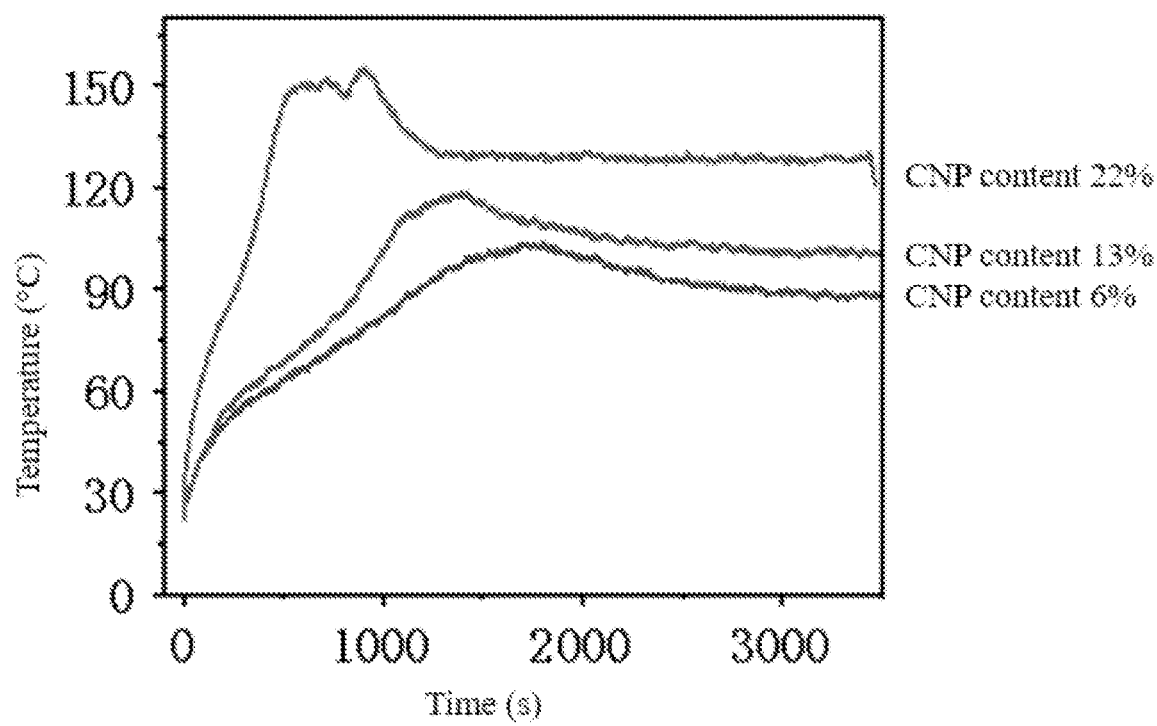
FIG. 4 is a heating curve of the epoxy resin material prepared by the curing molding process of the present invention.
Figure 5:
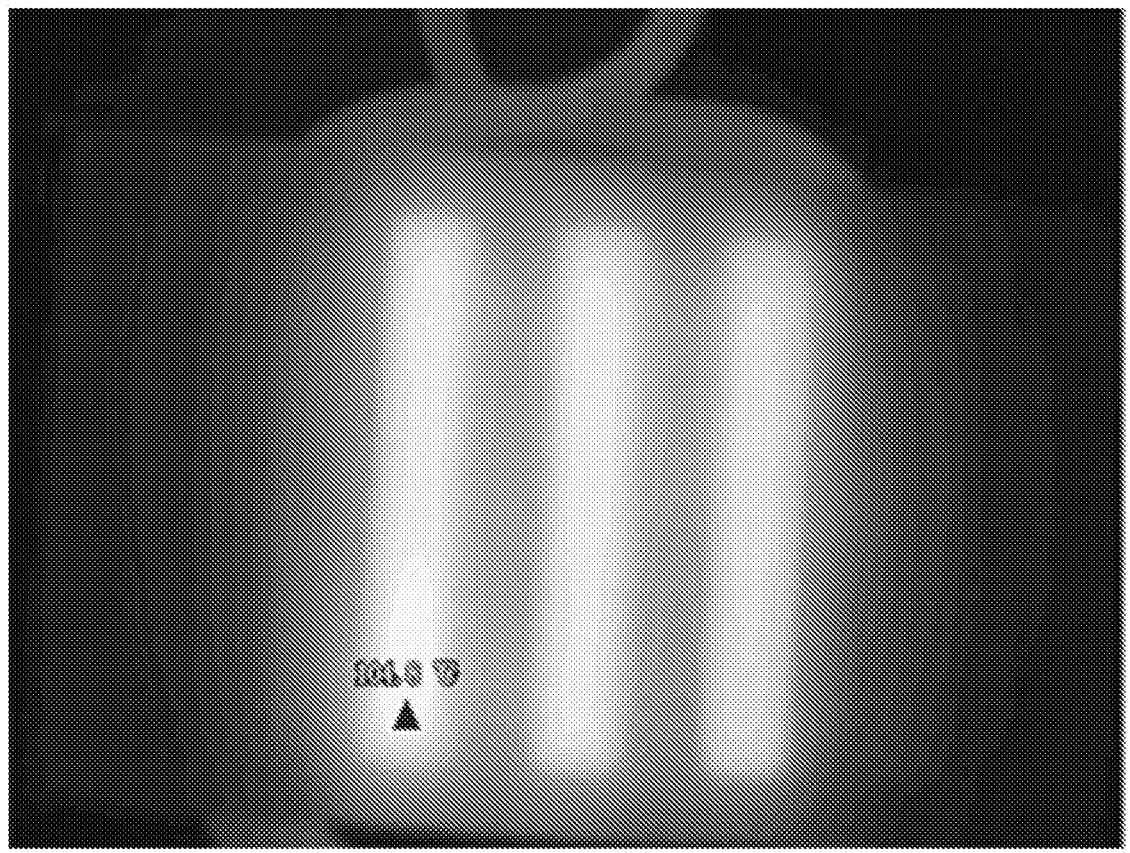
FIG. 5 is a heating effect diagram of the epoxy resin prepared by the curing molding process of the present invention under an infrared thermal imager.

In FIG. 4, after CNPs of different contents are added to the resin, the heating curves under the electromagnetic induction heating process show that the temperature is reduced a little to reach a stable temperature after reaching the highest temperature.

The foregoing descriptions are merely preferred embodiments of the present invention, and are not intended to limit the present invention. Within the spirit and principles of the present invention, any modifications, equivalent substitutions, improvements, etc., are within the protection scope of the present invention.

What is claimed is:

1. A fast-curing molding process for epoxy resin based on electromagnetic induction heating, comprising the following steps:
    S1, mixing epoxy resin A glue and a protein-grafted manganese-zinc-iron oxide nanomaterial into a colloidal state to obtain a mixture, and grinding the mixture for 10 to 30 min;
    S2, adding epoxy resin B glue to the mixture in S1, and performing ultrasonic dispersion at 20 to 30° C. for 10 to 30 min; and
    S3, placing the mixture obtained after ultrasonic dispersion in S2 in a vacuum environment for 20 to 40 min, then taking the mixture out and injecting the mixture into a mold, placing the mold and the mixture into an electromagnetic induction heater, placing the electromagnetic induction heater in a magnetic field environment with a magnetic field intensity of 1 to 1.5 mT for 2 to 3 h, cooling and then taking them out to obtain a cured epoxy resin, wherein
    a method for preparing the protein-grafted manganese-zinc-iron oxide nanomaterial comprises the following steps:
    S1, dissolving gelatin powder in 50 to 60 mL of acetic acid solution, stirring magnetically at 50 to 60° C. for 50 to 60 min, then cooling to 20 to 30° C., then adding a manganese-zinc ferrite nanomaterial and performing ultrasonic treatment for 10 to 20 min; and
    S2, performing suction filtration on the ultrasonically-treated mixed solution, washing the mixed solution with deionized water for 3 to 5 times, drying for 10 to 12 h, and grinding to obtain the protein-grafted manganese-zinc ferrite nanomaterial;
    a mass ratio of the epoxy resin A glue to the epoxy resin B glue to the protein-grafted manganese-zinc-iron oxide nanomaterial is 10:(3-3.5):(1.8-2.5); and
    a mass ratio of the gelatin powder to the manganese-zinc ferrite nanomaterial is 1:(2-3).

2. The fast-curing molding process for epoxy resin based on electromagnetic induction heating according to claim 1, wherein the acetic acid solution is an aqueous acetic acid solution having a volume fraction of 60 to 80%.

3. The fast-curing molding process for epoxy resin based on electromagnetic induction heating according to claim 1, wherein the protein-grafted manganese-zinc-iron oxide nanomaterial has an average particle size of 0.2 to 0.5 μm.

4. The fast-curing molding process for epoxy resin based on electromagnetic induction heating according to claim 1, wherein the manganese-zinc ferrite nanomaterial has a magnetic permeability of 2400 to 2600 dB/dH.

5. The fast-curing molding process for epoxy resin based on electromagnetic induction heating according to claim 1, wherein the manganese-zinc ferrite nanomaterial has a Mn/Zn mass ratio of 3:(1-1.5).

6. The fast-curing molding process for epoxy resin based on electromagnetic induction heating according to claim 1, wherein the epoxy resin A glue is one of YH-9621 epoxy resin A glue, E-51 epoxy resin A glue, and K-960 epoxy resin A glue.

7. The fast-curing molding process for epoxy resin based on electromagnetic induction heating according to claim 1, wherein the epoxy resin B glue is one of YH-9621 epoxy resin B glue, 650 low molecular weight polyamide resin, and K-960 epoxy resin B glue.

* * * * *